United States Patent
Visegrady et al.

(10) Patent No.: US 11,177,957 B2
(45) Date of Patent: Nov. 16, 2021

(54) HARDWARE SECURITY MODULES FOR EXECUTING ZERO-KNOWLEDGE PROOFS

(71) Applicant: International Business Machines Corporation, Armonk, NY (US)

(72) Inventors: Tamas Visegrady, Zurich (CH); Jan L. Camenisch, Thalwil (CH); Manu Drijvers, Adliswil (CH); Silvio Dragone, Olten (CH)

(73) Assignee: International Business Machines Corporation, Armonk, NY (US)

( * ) Notice: Subject to any disclaimer, the term of this patent is extended or adjusted under 35 U.S.C. 154(b) by 208 days.

(21) Appl. No.: 16/438,759

(22) Filed: Jun. 12, 2019

(65) Prior Publication Data

US 2020/0396075 A1 Dec. 17, 2020

(51) Int. Cl.
*H04L 9/32* (2006.01)

(52) U.S. Cl.
CPC .......... *H04L 9/3218* (2013.01); *H04L 9/3234* (2013.01)

(58) Field of Classification Search
CPC ... H04L 9/3218; H04L 9/3234; H04L 9/3239; H04L 9/32; H04L 63/00
See application file for complete search history.

(56) References Cited

U.S. PATENT DOCUMENTS

| 8,843,997 | B1  |   | 9/2014  | Hare    |            |
|-----------|-----|---|---------|---------|------------|
| 9,467,292 | B2  |   | 10/2016 | Nahari  |            |
| 10,447,475| B1  | * | 10/2019 | Lindell | H04L 9/0822|
| 2015/0095655 | A1 |   | 4/2015  | Sherman |            |
| 2016/0164901 | A1 | * | 6/2016  | Mainieri | H04L 63/1425 726/23 |
| 2019/0073225 | A1 | * | 3/2019  | Mace    | G06F 9/3851|

(Continued)

FOREIGN PATENT DOCUMENTS

CN 103516522 A 1/2014

OTHER PUBLICATIONS

Eli Ben-Sasson, Alessandro Chiesa, Daniel Genkin, Eran Tromer and Madars Virza "SNARKs for C: Verifying Program Executions Succinctly and in Zero Knowledge" Oct. 7, 2013.

(Continued)

*Primary Examiner* — Quazi Farooqui
(74) *Attorney, Agent, or Firm* — Harrington & Smith (57) ABSTRACT

Hardware security modules for executing zero-knowledge proofs are provided. Such a module includes multiple computational engines for executing respective primitive operations of zero-knowledge proofs, and memory storing multiple data-flow graphs. Each data-flow graph defines computational functionality of a respective one of the proofs, and comprises a set of nodes, each representing a said primitive operation, interconnected by edges representing input/output data of nodes. At least edges which represent security-sensitive data are indicated by edge-labels in the graphs. The module further comprises a set of registers, comprising at least a subset of secure registers, for storing data during execution of proofs, and a processor configured to control execution, using said engines, of proofs defined by the set of dataflow graphs such that data corresponding to a security-sensitive edge in a graph is stored in a secure register during execution. Corresponding methods and computer program products are also provided.

19 Claims, 4 Drawing Sheets

(56) References Cited

U.S. PATENT DOCUMENTS

2019/0303623 A1* 10/2019 Reddy ................ G06F 11/3692
2019/0379684 A1* 12/2019 Brown .................... H04L 63/20
2020/0178286 A1* 6/2020 Yu ........................ H04L 5/0053

OTHER PUBLICATIONS

Jan Camenisch, Tamas Visegrady, Manu Drijvers, Silvio Dragone "Data Flow Verification of Computation over Sensitive Data Compiled to Application-Specific Instruction Set Processors (ASIPS)" retrieved May 20, 2019.

* cited by examiner

$$A \leftarrow (g_1 \cdot h_0^s \cdot gpk \prod_{i=1}^{L} h_i^{a_i})^{\frac{1}{t+x}}$$

```
op.code
000a  0005  0000  8004            r5 = hash(r4)
0004  0006  0003  8005  4002      r6 = r3 ^ r5 mod r2
0003  0007  0006  0001  4002      r7 = r6 × r1 mod r2
      result ^^    ^^ register/s
```

Figure 6c

HARDWARE SECURITY MODULES FOR EXECUTING ZERO-KNOWLEDGE PROOFS

BACKGROUND

The present invention relates generally to hardware security modules for executing zero-knowledge proofs. Hardware security modules adapted for execution of such proofs are provided, together with methods for enabling hardware security modules to execute such proofs.

Zero-knowledge proof-of-knowledge protocols are widely used in cryptographic processes to allow a prover computer to prove knowledge of a secret, such as a private key, to a verifier computer. These zero-knowledge proofs (ZKPs) allow the prover to demonstrate the required knowledge without revealing the secret itself or any other potentially security-sensitive information. Such proofs are used in numerous applications in a wide variety of computer-based environments. Some examples include device authentication in computer networks, identity or other credential verification in public-service applications, financial/commercial transactions, and blockchain systems.

ZKPs can be implemented in various ways by combining standard ("primitive") cryptographic operations, such as cryptographic key generation, modular exponentiation, hash functions, etc., into proof-specific algorithms. Hardware security modules (HSMs) provide a protected environment for implementing a specific proof, or for storing and processing secret keys for proofs executed by a host computer. These modules incorporate security mechanisms to inhibit theft or tampering with security-sensitive data and secure processing operations. Common security mechanisms include physical protection such as secure containers and encapsulation of components which inhibit access and/or render devices inoperable in the event of tampering, and may include responsive mechanisms which generate alerts and/or delete secret data if tampering or unauthorized access is detected. HSMs typically accommodate a restricted set of processing operations, as opposed to generic computation offered by a general-purpose/fully-reconfigurable processing environment, to satisfy security constraints and/or legal (e.g. export) requirements.

SUMMARY

According to one aspect of the present invention there is provided a hardware security module for executing zero-knowledge proofs. The module includes a plurality of computational engines for executing respective primitive operations of the zero-knowledge proofs, and memory storing a plurality of data-flow graphs each of which defines computational functionality of a respective one of said proofs and comprises a set of nodes. Each node represents a said primitive operation, interconnected by edges representing input/output data of nodes, wherein at least edges which represent security-sensitive data are indicated by edge-labels in said graphs. The module includes a set of registers, comprising at least a subset of secure registers, for storing data during execution of a respective one of said proofs. The module includes a processor configured to control execution, using said engines, of proofs defined by the set of dataflow graphs such that data corresponding to a security-sensitive edge in a graph is stored in a said secure register during execution.

Another aspect of the present invention provides a method for enabling execution of zero-knowledge proofs in a hardware security module. The method includes generating a plurality of data-flow graphs each of which defines computational functionality of a respective one of the proofs and comprises a set of nodes, each representing a primitive operation of the respective proof, interconnected by edges representing input/output data of nodes. At least edges which represent security-sensitive data are indicated by edge-labels in said graphs. The method also includes storing said data-flow graphs in memory of a hardware security module which further comprises a plurality of computational engines for executing respective said primitive operations, a set of registers, comprising at least a subset of secure registers, for storing data during execution of said proofs. The method further includes controlling execution, using said engines, of proofs defined by the set of dataflow graphs such that data corresponding to a security-sensitive edge in a graph is stored in a said secure register during execution.

A further aspect of the present invention provides a computer program product comprising a computer readable storage medium embodying program instructions, executable by computing apparatus, to cause the computing apparatus to perform a method described above.

Embodiments of the invention will be described in more detail below, by way of illustrative and non-limiting example, with reference to the accompanying drawings.

DETAILED DESCRIPTION

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments may be a system, a method, and/or a computer program product. The computer program product may include a computer readable storage medium (or media) having computer readable program instructions thereon for causing a processor to carry out aspects of an exemplary embodiment.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the exemplary embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the exemplary embodiments.

Aspects of the exemplary embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments herein. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments herein provide methods for enabling execution of zero-knowledge proofs in a hardware security module. Such methods may be implemented by computing apparatus comprising one or more general- or special-purpose computers, each of which may comprise one or more (real or virtual) machines, providing functionality for implementing operations described herein. Steps of methods embodying the exemplary embodiments may be implemented by program instructions, e.g. program modules, implemented by a processing device of the apparatus. Generally, program modules may include routines, programs, objects, components, logic, data structures, and so on that perform particular tasks or implement particular abstract data types. The computing apparatus may be implemented in a distributed computing environment, such as a cloud computing environment, where tasks are performed by remote processing devices that are linked through a communications network. In a distributed computing environment, program modules may be located in both local and remote computer system storage media including memory storage devices.

Figure 1:
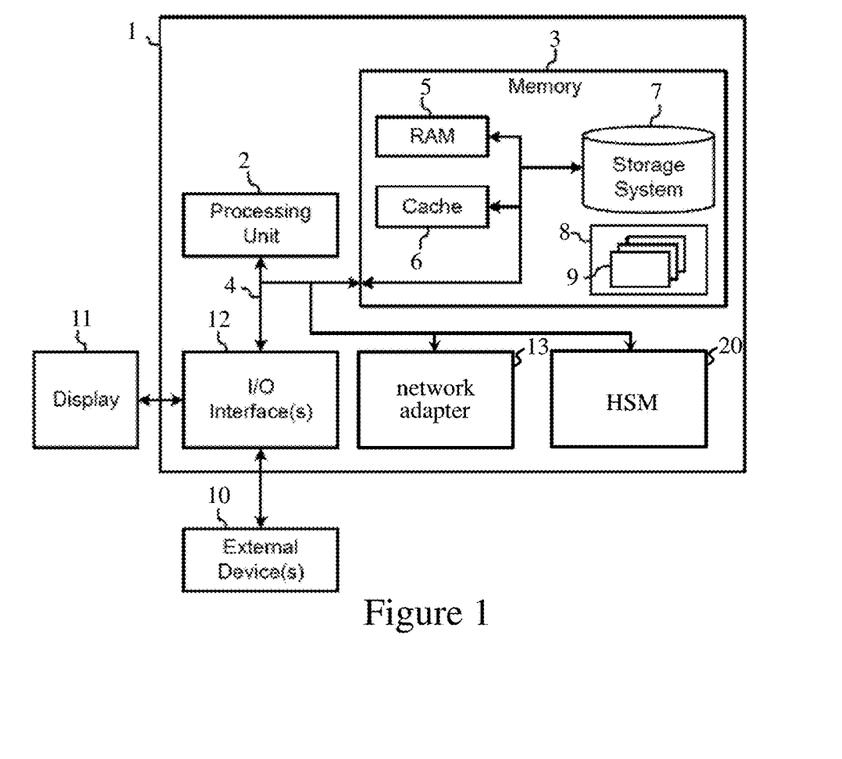
FIG. 1 is a schematic representation of computing apparatus for implementing exemplary embodiments.

FIG. 1 is a block diagram of exemplary computing apparatus for implementing steps of methods embodying an exemplary embodiment. The computing apparatus is shown in the form of a general-purpose computer 1. The components of computer 1 may include processing apparatus such as one or more processors represented by processing unit 2, a system memory 3, and a bus 4 that couples various system components including system memory 3 to processing unit 2.

Bus 4 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 1 typically includes a variety of computer readable media. Such media may be any available media that is accessible by computer 1 including volatile and non-volatile media, and removable and non-removable media. For example, system memory 3 can include computer readable media in the form of volatile memory, such as random access memory (RAM) 5 and/or cache memory 6. Computer 1 may further include other removable/non-removable, volatile/non-volatile computer system storage media. By way of example only, storage system 7 can be provided for reading from and writing to a non-removable, non-volatile magnetic medium (commonly called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can also be provided. In such instances, each can be connected to bus 4 by one or more data media interfaces.

Memory 3 may include at least one program product having one or more program modules that are configured to carry out functions of embodiments described herein. By way of example, program/utility 8, having a set (at least one) of program modules 9, may be stored in memory 3, as well as an operating system, one or more application programs, other program modules, and program data. Each of the operating system, one or more application programs, other program modules, and program data, or some combination thereof, may include an implementation of a networking environment. Program modules 9 generally carry out the functions and/or methodologies of embodiments as described herein.

Computer 1 may also communicate with: one or more external (e.g., or internal) devices 10 such as a keyboard, a pointing device, a display 11, etc.; one or more devices that enable a user to interact with computer 1; and/or any devices (e.g., network card, modem, etc.) that enable computer 1 to communicate with one or more other computing devices. Such communication can occur via Input/Output (I/O) interfaces 12. Also, computer 1 can communicate with one or more networks such as a local area network (LAN), a general wide area network (WAN), and/or a public network (e.g., the Internet) via network adapter 13. As depicted, network adapter 13 communicates with the other components of computer 1 via bus 4. Computer 1 can also communicate with an HSM 20, described further below, for implementing methods described herein. In general, HSM 20 may be internal or external to computer 1. It should be understood that although not shown, other hardware and/or software components could be used in conjunction with computer 1. Examples include, but are not limited to: microcode, device drivers, redundant processing units, external disk drive arrays, RAID systems, tape drives, and data archival storage systems, etc.

Figure 2:
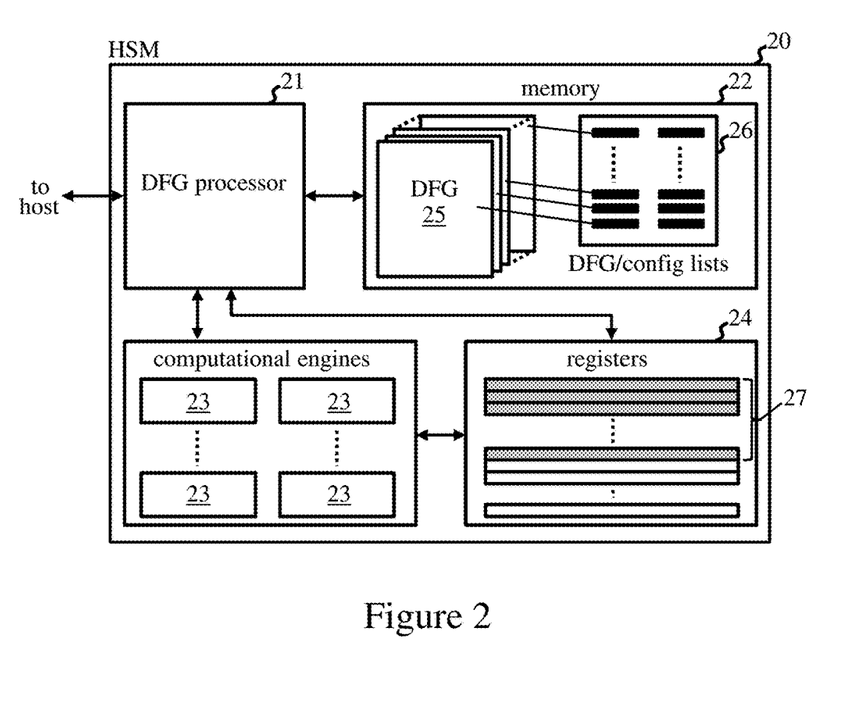
FIG. 2 is a schematic block diagram of an HSM.

FIG. 2 is a schematic block diagram of an HSM 20 in an exemplary embodiment. The HSM 20 comprises circuitry comprising a processor indicated as DFG (data-flow graph) processor 21, memory 22, a plurality of computational engines 23, and a set of registers 24. The computational engines 23 are configured for executing respective primitive operations of ZKPs. Memory 22 stores a plurality of data-flow graphs (DFGs) 25. Each DFG 25 defines computational functionality of a ZKP. In the embodiment shown, memory 22 also stores DFG and configuration (config) lists for the DFGs 25. These lists, discussed further below, are indicated generally at 26. The registers 24 store data during execution of a ZKP in HSM 20. These registers comprise at least a subset of secure registers, indicated here as the subset of shaded registers 27.

In operation, HSM 20 executes ZKPs defined by the set of DFGs stored in memory 22 of the module. As explained in more detail below, each of these DFGs comprises a set of nodes interconnected by edges. Each node represents a primitive operation of ZKPs, and edges represent input/output data of nodes. The DFGs 25 also include labels which indicate certain security-relevant properties of graph components. In particular, at least edges which represent security-sensitive data are indicated by edge-labels in the DFGs. Certain exemplary embodiments include node-labels and additional edge-labels as detailed below. DFG processor 21 is configured to control execution of the ZKPs using (at least in part) computational engines 23 of the HSM. Proofs are executed such that data corresponding to a security-sensitive edge in a graph, as indicated by the edge-labels, is stored in a secure register 27 during execution.

HSM 20 can be protected against tampering using security measures of generally known type, including physical mechanisms such as tamper-resistant containment, component encapsulation, etc., and may include security alert and/or other intrusion-response mechanisms. In some embodiments, all registers 24 may be secure registers. Register security may be provided by virtue of overall module security mechanisms and/or additional security may be applied to secure registers, such as encapsulation or other physical protection and/or anti-probing mechanisms, and hardware-enforced erasure at microelectronic speed in response to physical tampering.

DFG processor 21 comprises control logic for implementing functional steps of operations detailed below and controlling HSM operation generally. The control logic may be implemented, in general, by hardware, software (executed by the processor 21) or a combination thereof. In particular, DFG processor 21 can be implemented by a restricted-instruction-set processor such as an ASIP (application-specific instruction set processor). In certain exemplary embodiments, processor 21 is implemented by an embedded microcontroller. In general, processor 21 may comprise one or more processing devices and may include processor memory (comprising ROM, RAM, cache memory, etc.) storing program instructions, e.g., program modules, executable by a processing device to perform operations detailed below, such as interaction with verifiers requesting execution of ZKPs, compilation of DFGs into executable code, and attestation of HSM functionality. Though shown separately in the figure, memory 22 may be integrated in processor 21 and may comprise write-protected memory such as ROM in which DFGs and associated metadata can be stored but cannot be modified (at least without security authentication) after storage. Alternatively, or in addition, memory 22 may be protected by cryptographic features to ensure non-malleability.

Computational engines 23 can be efficiently implemented as hardware engines, such as ASICs (application-specific integrated circuits), customized to implement specific primitive operations which form the building blocks of ZKPs. In general, engines may be implemented by hardware/software or a combination thereof. For example, some engines may include embedded processing devices for executing specialized operations defined by program modules stored in device memory. Embodiments might also be envisaged in which certain engines are implemented by program modules stored in memory of DFG processor 21. In general, while components 21 through 24 are indicated by distinct blocks in the figure, functionality of one or more components may be (wholly or partially) combined as appropriate. Connecting lines in the figure may represent one or more connections/links of various types, including hard-wired circuit connections and communication buses using a variety of protocols implemented by appropriate control functionality in module components.

Figure 3:
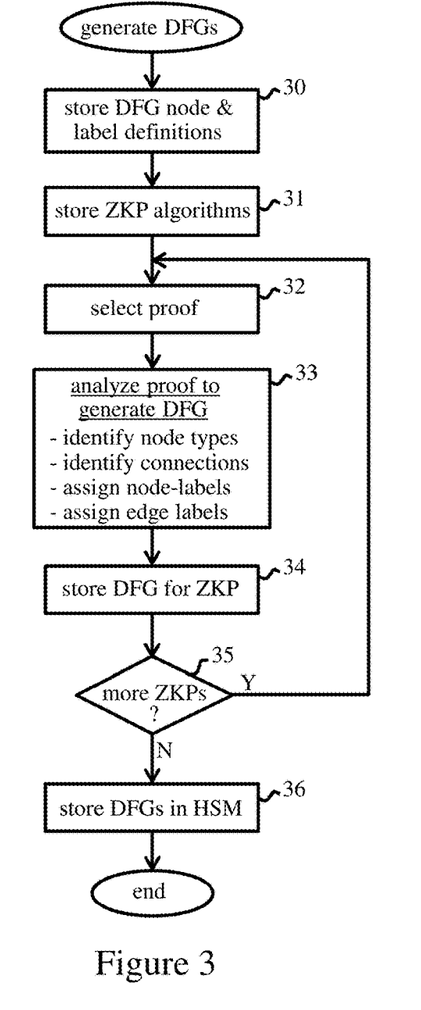
FIG. 3 indicates steps involved in generating data-flow graphs for ZKPs in methods embodying an exemplary embodiment.

FIG. 3 indicates basic steps involved in generating the DFGs 25 stored in memory 22. DFG generation can be performed offline, prior to operation of HSM 20, and may be a (wholly or partially) automated process. In particular, steps of the DFG generation process can be implemented by program modules executable by a computing apparatus such as host computer 1. Step 30 of FIG. 3 represents definition in the computing apparatus of node and label types to be used in DFGs. Hence, the primitive ZKP operations which are to be represented by nodes (and implemented by engines 23 of HSM 20) are defined here, along with the particular security-relevant properties to be identified and indicated by labels in the graphs. Node and label definitions are described further below. The various definitions may be predefined in the computing apparatus or based (at least partially) on operator input for specific implementations. In step 31, the ZKP algorithms to be represented by DFGs are stored in the computing apparatus. In step 32, a first proof is selected for conversion to DFG representation. (Construction of DFGs to represent processes/algorithms is a well-known technique, and only key features specific to embodiments herein are described in the following). In step 33, the computing apparatus analyses the ZKP to identify graph elements and interconnections. In particular, primitive operations defined in step 30 are identified in the proof, and nodes of the corresponding type are defined for these operations. Interconnections between nodes are identified from structure of the proof algorithm, and edges are defined in the graph to represent interconnections and other inputs/outputs of individual nodes. Security-relevant properties, defined in step 30, of graph components, i.e. edges/nodes, are also identified and the corresponding labels are assigned to these components. Extraction of these DFG features from the proof algorithm can be achieved, for example, using pattern matching tools which analyse an algorithm to identify primitive operation patterns and identify input/output features. The resulting DFG for the proof is then stored in step 34.

In decision step 35, the computing apparatus determines if there are further ZKPs to be processed. If so ("Y" at step 35), operation reverts to step 32 and steps 33 and 34 are repeated for the next proof. When all ZKPs have been processed (decision "N") at step 35), operation proceeds to step 36. The set of DFGs are then stored in memory 22 of HSM 20, and the operation is complete.

Figure 4:
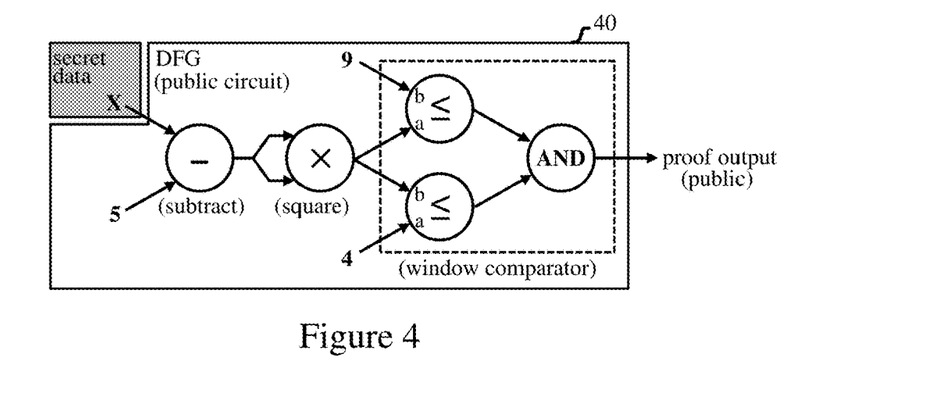
FIG. 4 is a simple illustration of data-flow graph construction for a proof.

While ZKPs typically involve complex algorithms, the principles of DFG representation of ZKPs can be understood from FIG. 4 which illustrates DFG construction for a contrived, highly-simplistic proof. The proof itself is a public, auditable, fixed computation. The proof picks up secret data at defined points, but must not reveal the secret data itself. Certain parameters, e.g. some proof-specific inputs and/or intermediate values, may be made known to verifiers, as well as the result/output of the proof itself. These "public" values must convince the verifier that the proof is satisfied. In the simple example of FIG. 4, the proof demonstrates that a secret value is a member of a defined set of integers without revealing the secret value per se. This is achieved by proving that an intermediate value, derived from the secret value, lies within a defined range. The DFG 40 (also known as a "circuit") contains nodes (circles) representing the primitive operations subtract (−), multiply (×), threshold comparison (≤), and Boolean AND. Edges (arrows) represent node inputs and/or outputs and interconnect the nodes as shown. The numbers 4, 5 and 9 here represent proof-specific constants. The value "x" is the only secret data in this example. The graph 40 picks up secret x on an input edge to the initial, subtract node which receives proof-specific constant 5 on another input edge. This node's output edge passes (x−5) to both input edges of the next, multiply node. This node thus passes an intermediate value $y=(x-5)^2$ to its output edges which provide inputs to the two threshold comparator nodes. Each of these nodes passes logic 1 to its output edge if the value on its input marked "a" is less than or equal to the value on its input marked "b". Otherwise logic 0 is passed to the output edge. The output edges of these two nodes provide inputs to the AND node, which thus outputs logic 1 if both inputs are at logic 1, and otherwise outputs logic 0. The AND node output represents the public output value of the proof. If the proof output is logic 1, this proves that the intermediate value $y=(x-5)^2$ lies in the range $4 \leq x \leq 9$. Given all inputs are integers, this in turn proves that the original secret x lies in the set $\{2, 3, 7, 8\}$ without revealing x itself.

True ZKP range proofs are obviously performed over very much larger ranges, and perform more complex information-hiding/one-way transform operations. Typical ZKP transformations involve modular arithmetic with one or more defined modulus constants, and operations may be performed over polynomial expressions using modular exponentiation. For example, polynomial-based proofs generally show that a function $f(x)$ for some x is a known value, where the proof involves selecting polynomial coefficients which only produce an expected value if the proof is passed an x from a fixed set of values. However, the simple example of FIG. 4 illustrates generally how ZKPs can be represented by DFGs, and application to real ZKPs will be apparent to those skilled in the art from the principles described herein. Such ZKPs may in general be interactive (requiring a sequence of interaction steps between prover and verifier), or non-interactive (generating a proof output without intervening message roundtrips with the verifier).

DFGs can be stored in memory as data structures of generally known types. All nodes are identified by respective node IDs (identifiers), and edges are identified by corresponding edge IDs. Node and edge IDs can be stored along with any associated labels which indicate security-relevant properties of the components. Connections between nodes/edges can be indicated in any convenient manner in the data structure, e.g. by pointers to connected components.

Labels may indicate various security-relevant properties (attributes) of elements of a DFG. Edges which represent security-sensitive data, e.g. secret data x in the above example, may be indicated via edge-labels in the graph, e.g. by labeling all such edges as security sensitive edges (or conversely by labeling all non-security-sensitive edges which represent public/non-secret data). As detailed below, in certain exemplary embodiments all edges which represent security-sensitive data and all edges which represent public data have associated edge-labels in the DFGs. Edges which represent proof-specific constants may also have associated edge-labels. It is also useful to know security-relevant properties of nodes. Embodiments might be envisaged in which particular node properties can be inferred from edge-labels (e.g. whether a node which converts secret input(s) to a non-secret (public) output). However, DFG nodes in certain exemplary embodiments have associated node-labels indicating respective security-relevant properties of the primitive operations represented by those nodes. This facilitates graph analysis for various purposes discussed below. For example, nodes representing primitive operations which process security-sensitive data can be indicated by node-labels in the graphs. Hence, nodes which receive, use or generate secret data may have associated node-labels. These may include nodes which use embedded secrets as well as nodes which otherwise have security-sensitive inputs and/or outputs. Nodes which process only non-security sensitive data may similarly be labeled as such. Node-labels may further categorize nodes according to type of operation and/or nature of security-sensitivity. By way of example, embodiments herein may use nodes representing all or a subset of the following primitive operations:

generate private key of predefined types (both RSA (Rivest-Shamir-Adleman) and EC (elliptic curve) types);
generate a public key from a private key;
modular multiply, (e.g. A*B mod N);
modular exponentiate, (e.g. A^D mod N);
scalar multiply over elliptic curves, (e.g. k*P (with curve-indexed P));
modular invert, (e.g. 1/A mod N);
generate PRF (pseudorandom function), (no input; generates PRF bits);
hash[append], (incremental or single-pass cryptographic hashing);
modular reduce (e.g. A mod N);
truncate to N bits;
reduce with [curve/parameter-specified] modulus;
coordinate verify (of predefined types as for key generation);
hash-to-curve (or any type of parameter set);
constant value (specify constants/Verifier-provided data);
add DFG-embedded (hardwired) constant;
cross-check (conditional check/ensure operating under known conditions, e.g. "parameter X must be (DFG-embedded) constant Y");
Merkle-tree leaf (where Merkle trees are serialized in DFGs; can be addressed by top hash of tree);
conditional termination (supply exception marker and stop processing);
zeroize: explicit lifecycle termination (to wipe secure data).

Node-labels indicting node/operation-type can be assigned accordingly, and associated security relevant node-labels can be assigned according to secrecy or otherwise of inputs/outputs/embedded constants, etc. Edge labels of certain exemplary embodiments indicate the following proof-inferred edge properties:

edge is security-sensitive (represents security-sensitive/secret data);
edge is public (represents a public input value or potentially-sensitive data which has been converted to public form);
proof-specific constant (represents an embedded/specialized constant (a non-instruction (data) constant) specific to a particular proof instance, e.g. when a public key is embedded in a proof).

Node/edge labels may be defined in the DFG data structure in any convenient manner, e.g. as "type:value" pairs. In particular exemplary embodiments, nodes and edges are annotated with labels by embedding values corresponding to the defined set of security attributes into node/edge IDs. This facilitates DFG parsing during compilation/analysis operations since identification of security features involves simple bitmask operations.

Figure 5:
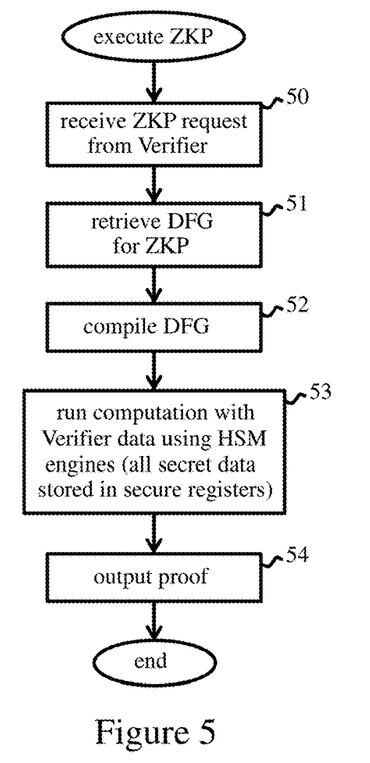
FIG. 5 indicates steps involved in execution of a ZKP in HSMs embodying an exemplary embodiment.

FIG. 5 indicates steps of the ZKP execution process in HSM 20. This process is performed in response to receipt of a request from a verifier computer, where the verifier computer may be host 1 or a remote computer communicating with the HSM/host via a network. In step 50, DFG processor 21 receives the request data supplied by the verifier. The request comprises data identifying the ZKP to be executed (all ZKPs are public, identifiable circuits) as well as all verifier data required as input to the ZKP. The request data thus typically comprises a proof/DFG ID, verifier's cryptographic key(s) to be input to the proof, and any other proof parameters/verifier data required for execution. Processor 21 retrieves the appropriate DFG from memory 22 in step 51. In step 52, processor 21 compiles the DFG into code executable on the underlying HSM hardware. This step is detailed further below. In step 53, processor 21 then runs the compiled code to execute the ZKP using computational engines 23 and registers 24. Security properties inferred from DFG labels ensure that all data corresponding to a security-sensitive edge (i.e. an edge indicated by the labels as representing security-sensitive data) in the DFG is stored in a secure register 27 during execution of the proof. In step 54, processor outputs the proof result (proof output in FIG. 4) to the verifier. The proof result may be provided in the form of a certificate/signature which allows the verifier to confirm that the proof is satisfied in the usual manner, e.g. using (public) proof parameters, HSM public key(s) and verifier key(s) associated with instantiation of the proof.

It can be seen that HSM 20 effectively implements a virtual machine (VM) offering execution of multiple ZKPs by enumerating operations on a small set of primitive computational engines 23. This is achieved by using DFGs, annotated with security-relevant labels, as an intermediate representation of ZKPs. Context of ZKP computations is preserved in this intermediate-level, DFG representation, enabling attestation and optimization (discussed further below) of HSM functionality while still permitting efficient ZKP execution by dynamic configuration of the array of hardware engines. While the field of ZKPs is diverse, most ZKPs combine only a small set of primitive operations, and diverge mainly in interconnect complexity. A wide variety of ZKPs can be represented using less than 20 primitive DFG operations. Most of these map to typical cryptographic engines, and are eminently suitable for execution in secure hardware with minor VM implementation costs. Using this intermediate-level decomposition of ZKPs to DFGs, it is estimated that all current ZKP schemes can be implemented with only a few dozen primitive engines.

The process of DFG compilation (step 52 of FIG. 5) is explained further below. The rules of processing DFG-described data are well-known, e.g. DFG/tree serialization rules, and the compilation process can be implemented using DFG-aware tools, such as certain compilers, in a generally known manner. The addition of security-relevant attributes in the DFG representation of ZKPs can be accommodated by analysis of labels, e.g. via simple bit-masking operations, performed by the compiler during DFG transformation. Primitives (nodes) are register-to-register operations. Primitives may accommodate, for instance, up to three inputs and a single output in a typical embodiment. A DFG may be transformed into a packed array of be 32 parameters. It is noted that "be" stands for big endian, which is a byte order where the "big end", most significant byte, is stored first (at the lowest storage address). Regarding the primitives, primitive operations may be represented as illustrated in the following, where the initial eight digits represent the (hexadecimal) operation ID/instruction, and subsequent entries represent type/register IDs and other instruction-specific arguments:

generate private key
    0000'0001 <keytype*> <result>
generate public key from private key
    0000'0002 <keytype*> <result> <input>
modular exponentiate
    0000'0004 <result> <base> <exponent> <modulus>
scalar multiply
    0000'0005 <curve/param.set*> <result> <scalar>
modular inverse
    0000'0006 <curve/param.set*> <result> <input> where types, unless *-terminated, are registers (register identifiers).

Register identifiers are 32-bit values (assumed unsigned int/32 format). The most significant 8 bits are reserved for type-tagging. In an exemplary embodiment, 80 registers are reserved as security sensitive registers 27 (FIG. 2) and 40 registers are available for non-sensitive values.

DFG/tree serialization rules may assume canonic DFG form for description and evaluation. Breadth-first DFG serialization may be performed using a predefined enumeration order. This order may depend on (1) operation position and (2) input/output index constant. Operations may be enumerated in increasing DFG-depth order: (1) all operations with direct inputs (no dependencies on operation output); (2) all operations with inputs from (1) or direct inputs; (3) all operations with inputs from (2), (1) or direct inputs. For operations of the same depth, input/output register indexes can be used to break ties. Input register indexes can be concatenated in increasing order, appending the output index. Register indexes may be assigned in operation-chronological order. For hardware-friendliness DFGs may be sent in topological (chronological) order, and core register IDs may follow in increasing order. This allows single-pass parsing and processing, though parallelism and incremental write of DFGs is still possible as discussed below. The node-count, register-count, and graph-depth limit may be predefined for operation.

Figure 6A:
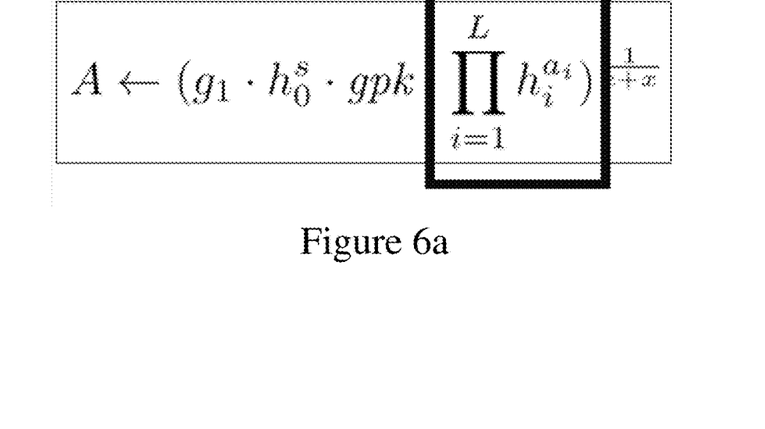
FIGS. 6a through 6c illustrate compilation of executable code for a portion of a ZKP.
Figure 6B:
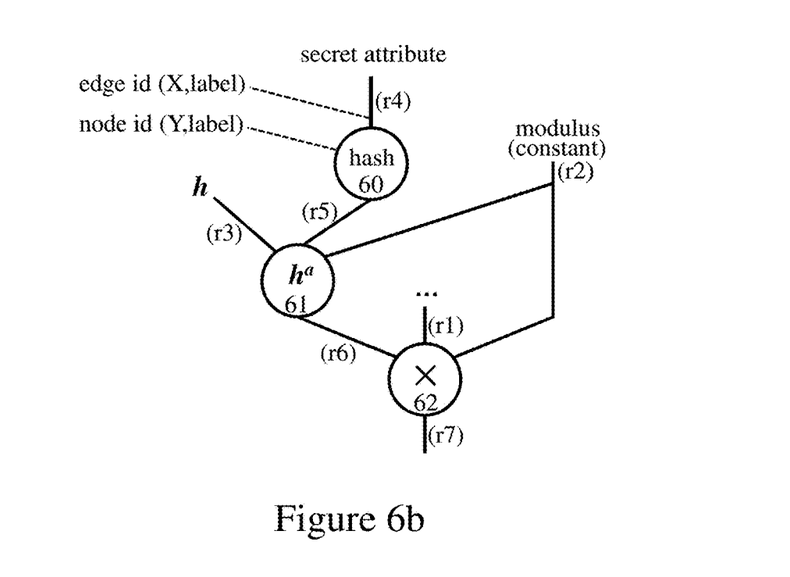
Figure 6C:
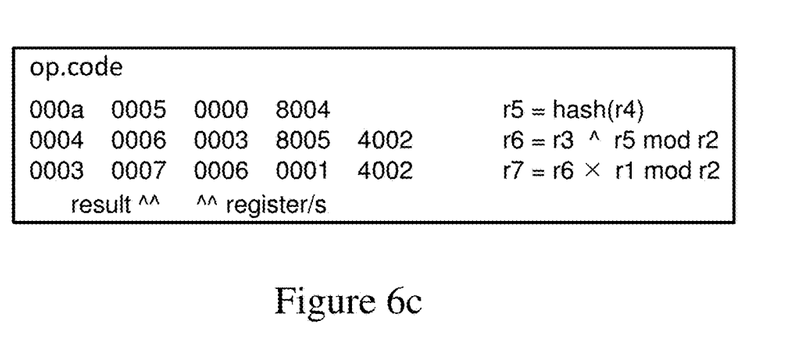

The example of FIGS. 6a through 6c provides an illustration of the above process. This can be performed by a simple interpreter in certain exemplary embodiments. FIG. 6a defines computation of a value A in a ZKP. This involves computing the product of a series $\Pi_{i=1}^{L} h_i^{a_i}$ as indicated by the bold square in the figure. The entire equation is the following:

$$A \leftarrow \left(g_1 \cdot h_0^x \cdot gpk \prod_{i=1}^{L} h_i^{a_i}\right)^{\frac{1}{e+x}}.$$

The product computation can be represented by the portion of a DFG shown in FIG. 6b. As indicated schematically in relation to the upper (hash) node here, all nodes/edges are identified by corresponding node/edge IDs with embedded security labels. FIG. 6c illustrates HSM-executable code corresponding to FIG. 6b, where 32-bit (8-digit hexadecimal) values are reduced (e.g., contracted) to 4 hexadecimal digits in the figure by omitting the middle four 0's from each value). Node inputs/outputs are stored in registers r1 to r7 with IDs from 5001 to 5007 respectively, where S=8 denotes the leading (digit) tag corresponding to a secure register 27, and S=4 denotes the tag corresponding to a non-sensitive register. The edges representing data stored in these registers are marked r1 through r7 in FIG. 6b for ease of explanation. Node 60 in FIG. 6b corresponds to the first line of code in FIG. 6c. This node takes a secret value stored in secure register r4 and outputs a hash of this value as parameter $a_i$ in the product term. As indicated by the second line of code, node 61 takes the parameter $h_i$ from register r3, the value $a_i$ stored in secure register r5, and a publicly-verifiable modulus (constant) m from non-sensitive register r2, and computes the modular exponentiation $h_i^{a_i}$ (mod m). The result is stored in register r6. The last line of code corresponds to node 62. This node takes the value in r6 and performs a multiplication (mod m) with the result of the series-product thus far, stored in register r1. The resulting product is stored in register r7. The operation thus iterates until series terms for all i have been computed and multiplied.

HSM 20 can attest its functionality to verifiers by certifying the stored DFGs corresponding to the ZKPs the HSM can execute. In particular, processor 21 may hash individual DFGs to generate a DFG list, comprising unique DFG IDs (hash values), which is stored in memory 22. In response to verifier attestation requests, processor 21 can cryptographically sign its DFG list and forward the signature to verifiers who can authenticate the HSM functionality from the (public) DFG circuits.

Figure 7:
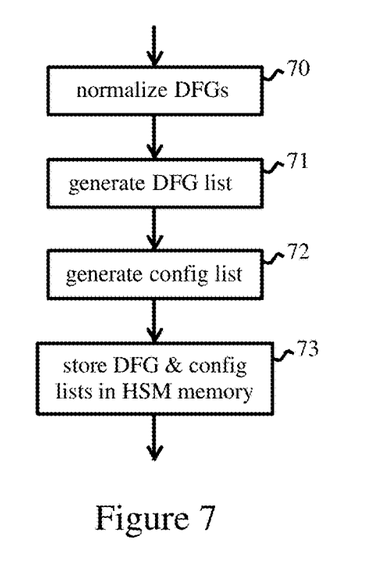
FIG. 7 indicates additional steps of the FIG. 3 method in exemplary embodiments.

Certain exemplary embodiments exploit the intermediate representation of ZKPs by security-annotated DFGs to offer further advantages and optimization features. FIG. 7 indicates additional steps performed in the DFG generation/provisioning process of FIG. 3 in these embodiments. These steps may be performed at any appropriate stage of the FIG. 3 operation, and may be performed by host computer 1, DFG processor 21 or a combination thereof. In step 70, host/processor normalizes the set of DFGs. In this step, DFGs for similar ZKPs which perform the same basic computation but differ in instance parameters, such as values of constants, are identified and normalized (combined). Differences, i.e. the different sets of instance parameters, are stored separately as configuration (config) parameters for individual proofs. As an example, when multiple DFGs of otherwise identical instructions are specialized to operate on different keys, the relationship between the related-but-different DFGs is made obvious through the annotated security attributes. In step 71, a DFG list is generated by hashing individual DFGs as described above. In step 72, a corresponding config list is generated by hashing the instance parameter set for each instance of a normalized DFG to generate a corresponding, unique configuration ID. In step 73, the DFG and associated config lists are stored in HSM memory 22 as indicated at 26 in FIG. 2. The additional steps of FIG. 7 allow representation of multiple ZKPs by a smaller subset of DFGs while still permitting convenient attestation of HSM state. Config lists can be attested as for DFG lists in this attestation process. Verifiers can request execution of a specific proof instance by specifying the corresponding DFG and config IDs.

The annotated DFG representation of ZKPs offers further DFG-visible optimization options for HSMs. For example, proof execution can be optimized according to HSM resource availability. DFG processor 21 (and/or offline analysis tools) can be configured to identify, for each DFG, a subgraph defining a portion of the corresponding proof which processes all security-sensitive data in that proof. Propagating the sensitive attribute of all DFG points marked as such allows straightforward graph-conversion steps to highlight all DFG nodes and edges containing sensitive data. (Inverting the DFG search criteria, and propagating known non-sensitive attributes to the maximum sub-graph which can be proven non-sensitive, marks the largest portion of a DFG which can be securely processed in an untrusted environment). This allows automatic discovery of DFG sub-graphs which must be executed inside a high-assurance environment. Processor 21 can then control execution of a ZKP such that at least that security-sensitive portion of the proof is executed in the HSM. Any remaining portion of the proof can be executed by an (untrusted) host computer operatively-coupled to the HSM, providing automatic partitioning of a DFG into host and secure-hardware portions.

In some embodiments, all computational engines 23 may be secure engines. In others, only a subset of engines 23 may be deemed secure. Processor 21 can be configured such that the primitive operation corresponding to a node which processes security-sensitive data in a graph is executed by a secure engine, and any remaining nodes are processed by other engines and/or by a host.

DFG processor 21 can be further configured to stage execution of the proof defined by a DFG graph in dependence on structure of the DFG and resource availability in the HSM. For example, operations which can be executed in parallel can be identified, e.g. by offline analysis of graph structure and/or dynamically by processor 21. Non-sensitive cuts of the DFG where operation can be temporarily suspended, e.g. by storing the data present on the DFG edges forming the cut, can also be identified. Larger ZKP operations in particular may benefit from the ability to suspend execution, saving the cut state, allowing the VM to stage execution (marking cuts as possible checkpoints/restore points). Various similar graph cut/coloring operations may be inferred by ZKP VM rules at compilation/runtime.

It is also possible to detect conflicts between non-sensitive and sensitive data when a ZKP VM operation expects to create a non-sensitive output, but the DFG edge receiving that output is marked as sensitive. As well as security rules, the DFG representation allows the ZKP VM to restructure a DFG to fit its restrictions. As an example, a ZKP VM aware of its resource constraints may load a DFG in a serialized form suitable for its particular limitations. The VM may also track availability of secure registers, and rely on both DFG and ZK-aware knowledge during DFG loading and execution. Mandating the DFG form as an interface allows balancing of host, DFG generation and ZKP VM complexity. As an example, the VM may require its DFGs to be serialized in a form suitable for single-pass parsing and execution.

Various other changes and modifications can of course be made to the exemplary embodiments described. In general, where features are described herein with reference to apparatus embodying the invention, corresponding features may be provided in a method/computer program product embodying the invention, and vice versa.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A hardware security module for executing zero-knowledge proofs, the module comprising circuitry comprising:
   a plurality of computational engines for executing respective primitive operations of the zero-knowledge proofs;
   memory storing a plurality of data-flow graphs each of which defines computational functionality of a respective one of said proofs and comprises a set of nodes, each representing a said primitive operation, interconnected by edges representing input/output data of nodes, wherein at least edges which represent security-sensitive data are indicated by edge-labels in said graphs;
   a set of registers, comprising at least a subset of secure registers, for storing data during execution of a respective one of said proofs; and
   a processor configured to control execution, using said engines, of proofs defined by the set of dataflow graphs such that data corresponding to a security-sensitive edge in a graph is stored in a said secure register during execution, wherein the processor is configured to control execution of a selected proof in response to receipt of request data from a verifier computer, said request data comprising data identifying the selected proof to be executed and verifier data required as input to the selective proof.

2. A module as claimed in claim 1 wherein nodes of said graphs have associated node-labels indicating respective security-relevant properties of the primitive operations represented by those nodes.

3. A module as claimed in claim 2 wherein:
   nodes representing primitive operations which process security-sensitive data are indicated by node-labels in said graphs;
   said plurality of computational engines comprise at least a subset of secure engines; and
   said processor is configured such that the primitive operation corresponding to a node which processes security-sensitive data in a graph is executed by a said secure engine.

4. A module as claimed in claim 3 wherein the processor is further configured:
   to identify, for each graph, a subgraph defining a portion of a corresponding proof which processes all security-sensitive data in that proof; and
   to control execution of that corresponding proof such that at least said portion of the corresponding proof is executed in the hardware security module and any remaining portion of the corresponding proof is executed by a host computer operatively-coupled to the module.

5. A module as in claim 3, wherein the processor is further configured, for each graph, to stage execution of the corresponding proof defined by that graph in dependence on structure of the graph and resource availability in the hardware security module.

6. A module as claimed in claim 1 wherein:
edges which represent security-sensitive data have associated edge-labels in said graphs; and
edges which represent public data have associated edge-labels in said graphs.

7. A module as claimed in claim 1 wherein edges which represent proof-specific constants have associated edge-labels in said graphs.

8. A module as claimed in claim 7 wherein said memory stores:
a graph list containing, for each graph, a graph identifier comprising a hash value generated from that graph; and
a configuration list containing, for each graph, at least one configuration identifier comprising a hash value generated from said proof-specific constants for a proof whose computational functionality is defined by that graph.

9. A module as claimed in claim 1 wherein said memory stores a graph list containing, for each graph, a graph identifier comprising a hash value generated from that graph.

10. A module as claimed in claim 1 wherein a said computational engine comprises an application-specific integrated circuit.

11. A module as claimed in claim 1 wherein said processor comprises an application-specific instruction set processor.

12. A method for enabling execution of zero-knowledge proofs in a hardware security module, the method comprising:
generating a plurality of data-flow graphs each of which defines computational functionality of a respective one of the proofs and comprises a set of nodes, each representing a primitive operation of the respective proof, interconnected by edges representing input/output data of nodes, wherein at least edges which represent security-sensitive data are indicated by edge-labels in said graphs;
storing said data-flow graphs in memory of the hardware security module which further comprises a plurality of computational engines for executing respective said primitive operations, and comprises a set of registers, comprising at least a subset of secure registers, for storing data during execution of said proofs; and
controlling execution, using said engines, of proofs defined by the set of dataflow graphs such that data corresponding to a security-sensitive edge in a graph is stored in a said secure register during execution, wherein the controlling execution controls execution of a selected proof in response to receipt of request data from a verifier computer, said request data comprising data identifying the selected proof to be executed and verifier data required as input to the selective proof.

13. A method as claimed in claim 12 including providing nodes of said graphs with associated node-labels indicating respective security-relevant properties of the primitive operations represented by those nodes.

14. A method as claimed in claim 13:
wherein nodes representing primitive operations which process security-sensitive data are indicated by node-labels in said graphs;
wherein said plurality of computational engines comprise at least a subset of secure engines; and
the method further comprising executing, by a said secure engine, the primitive operation corresponding to a node which processes security-sensitive data in a graph.

15. A method as claimed in claim 12 including:
providing edges which represent security-sensitive data with associated edge-labels in said graphs; and
providing edges which represent public data with associated edge-labels in said graphs.

16. A method as claimed in claim 12 including providing edges which represent proof-specific constants with associated edge-labels in said graphs.

17. A method as claimed in claim 12 including:
producing a graph list containing, for each graph, a graph identifier comprising a hash value generated from that graph; and
storing the graph list in said memory of the hardware security module.

18. A method as claimed in claim 12 including:
producing a graph list containing, for each graph, a graph identifier comprising a hash value generated from that graph; and
storing the graph list in said memory of the hardware security module.

19. A computer program product for enabling execution of zero-knowledge proofs in a hardware security module, said computer program product comprising a computer readable storage medium having program instructions embodied therein, the program instructions being executable by computing apparatus to cause the computing apparatus to perform operations comprising:
generating a plurality of data-flow graphs each of which defines computational functionality of a respective one of the proofs and comprises a set of nodes, each representing a primitive operation of the respective proof, interconnected by edges representing input/output data of nodes, wherein at least edges which represent security-sensitive data are indicated by edge-labels in said graphs;
storing said data-flow graphs in memory of the hardware security module which further comprises a plurality of computational engines for executing respective said primitive operations, and comprises a set of registers, comprising at least a subset of secure registers, for storing data during execution of said proofs; and
controlling execution, using said engines, of proofs defined by the set of dataflow graphs such that data corresponding to a security-sensitive edge in a graph is stored in a said secure register during execution, wherein the controlling execution controls execution of a selected proof in response to receipt of request data from a verifier computer, said request data comprising data identifying the selected proof to be executed and verifier data required as input to the selective proof.

* * * * *